United States Patent [19]

Mikami et al.

[11] Patent Number: 5,572,336
[45] Date of Patent: Nov. 5, 1996

[54] APPARATUS HAVING SEGMENTED MEMORY FOR HIGH-SPEED PARALLEL PROCESSING OF IMAGE DATA

[75] Inventors: Kazuhiko Mikami; Jun Yamashita, both of Iwatsuki, Japan

[73] Assignee: Fuji Xerox Co., Ltd., Tokyo, Japan

[21] Appl. No.: 461,544

[22] Filed: Jun. 5, 1995

Related U.S. Application Data

[63] Continuation of Ser. No. 115,085, Sep. 2, 1993.

[30] Foreign Application Priority Data

Sep. 4, 1992 [JP] Japan ................................ 4-262990

[51] Int. Cl.⁶ .................... H04N 1/40; H04N 1/00; H04N 1/32
[52] U.S. Cl. .................. 358/444; 358/404; 358/443; 358/468; 395/427
[58] Field of Search .................... 358/444, 404, 358/448, 443, 468, 450, 452, 453, 455, 462, 442; 395/425, 488, 842, 843, 844, 845, 846, 847; H04N 1/40, 1/00, 1/32

[56] References Cited

U.S. PATENT DOCUMENTS

| | | | |
|---|---|---|---|
| 4,499,715 | 3/1991 | Porcellio | 358/261.4 |
| 5,016,165 | 5/1991 | Tanikawa et al. | 395/842 |
| 5,032,923 | 7/1991 | Kurtin | 358/444 |
| 5,117,486 | 5/1992 | Clark et al. | 395/250 |
| 5,193,169 | 3/1993 | Ishikawa | 395/842 |
| 5,262,878 | 11/1993 | Esserman | 358/444 |
| 5,375,218 | 12/1994 | Umeda | 395/842 |
| 5,386,532 | 1/1995 | Sodos | 395/842 |
| 5,436,732 | 7/1995 | Mikami | 358/444 |

FOREIGN PATENT DOCUMENTS 62-176374  8/1987  Japan.

*Primary Examiner*—Edward L. Coles, Sr.
*Assistant Examiner*—Kimberly A. Williams
*Attorney, Agent, or Firm*—Finnegan, Henderson, Farabow, Garrett & Dunner, L.L.P.

[57] ABSTRACT

An image data processing apparatus for dividing one page of image data into segments for high-speed image data processing. Each of the image data segments is processed by a separate compandor. The processed data is stored in an FIFO memory corresponding to each of the compandors matching the segments. The data stored in the FIFO memory is moved from there to a compressed data storage by DMA data transfer under control of a DMA data transfer controller. The DMA data transfer controller, activated beforehand by a CPU, starts transferring data upon receipt of a DMA data transfer request signal DRQ generated by a DRQ control circuit corresponding to each FIFO memory. Since the DMA data transfer controller is already operational, it executes data transfers in a very short time on receiving the DMA data transfer request signal.

5 Claims, 4 Drawing Sheets

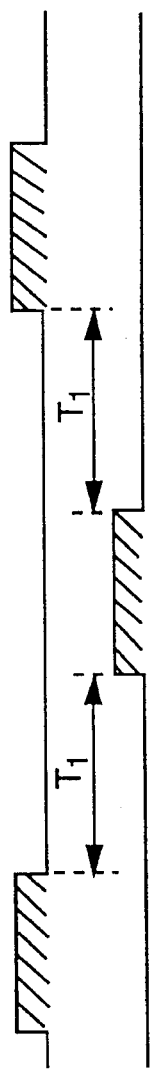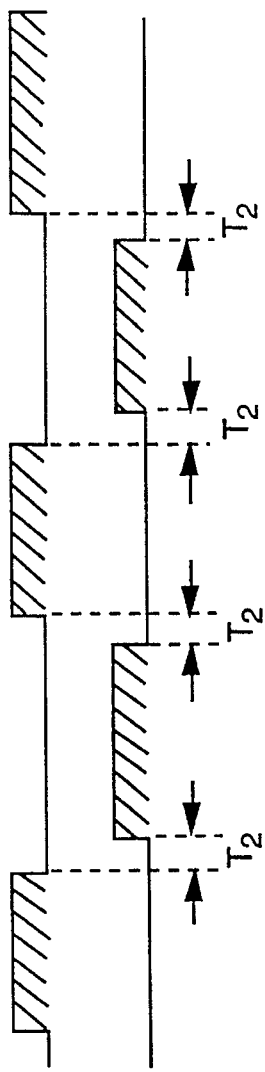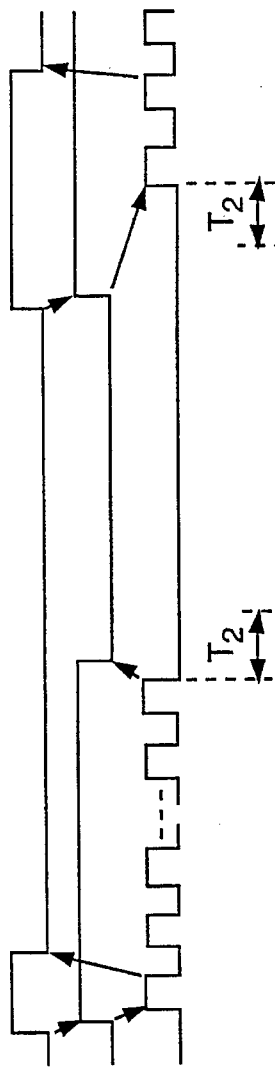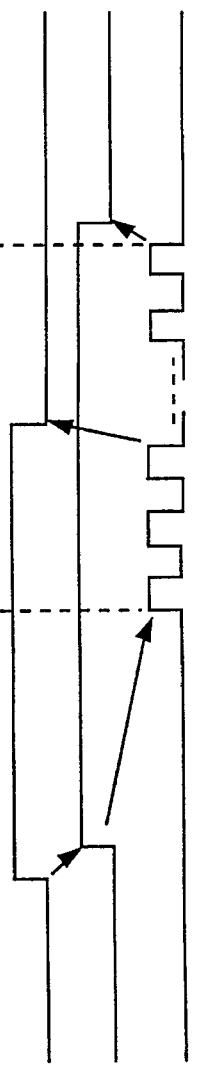
FIG. 5(A) FIG. 5(B) FIG. 5(C)

5,572,336

APPARATUS HAVING SEGMENTED MEMORY FOR HIGH-SPEED PARALLEL PROCESSING OF IMAGE DATA

This application is a continuation, of application Ser. No. 08/115,085 filed Sep. 2, 1993, now abandoned.

BACKGROUND OF THE INVENTION

1. Field of the Invention

The present invention relates to an image data processing apparatus for dividing one page of image data into a plurality of segments for high-speed image data processing.

2. Description of the Prior Art

There is proposed (as in Japanese Patent Laid-Open No. SHO/62-176374) an apparatus that compresses and expands image data at high speed by dividing each page of image data into a plurality of segments and by having each of the segments compressed and expanded by an individual compandor. This applicant has also disclosed a similar image data processing apparatus in Japanese Patent Application No. HEI/3-274667. FIG. 3 is a block diagram of this apparatus.

In FIG. 3, reference numeral 1 is a CPU (central processing unit); 2 is a DMAC (direct memory access controller); 3 is an IIT (image input terminal); 4 is an IOT (image output terminal); 5 is an image memory; 6-1 and 6-2 are compandors; 7 is an image data bus; 8-1 and 8-2 are FIFO (first-in first-out) memories for temporarily storing small quantities of data; 9 is another DMAC; 10 is a local DMA bus; and 11 is a compressed data storage means (e.g., RAM (random access memory)).

The image data entered from the IIT 3 is transferred to the image memory 5 over the image data bus 7. This transfer of the image data is a DMA data transfer performed under control of the DMAC 2. All data transfers in the description that follows are assumed to be DMA data transfers.

In the setup of FIG. 3, one page of image data is divided into two segments. FIG. 4 is a view showing one page of image data divided into two in the image memory 5, the divided images being denoted by numerals 5-1 and 5-2. The image data representing the divided images 5-1 and 5-2 are transferred to the compandors 6-1 and 6-2, respectively. Because one page of image data is divided into two segments that are compressed concurrently by two compandors, the processing time with the setup of FIG. 3 is far shorter than with the typical scheme of a single compandor handling one whole page of image data.

The compressed data from the compandors 6-1 and 6-2 are sent to the FIFO memories 8-1 and 8-2, respectively. From there, the data are moved by DMA transfer to the compressed data storage means 11 over the local DMA bus 10. These DMA data transfers are controlled by the DMAC 9. Before the DMAC 9 can start a DMA data transfer, the DMAC 9 needs to be activated by the CPU 1 executing a program for DMA data transfer start-up. That is, the DMAC 9 needs to be started by software.

FIG. 5(A)–(C) is a set of timing charts depicting typical timings of DMA data transfers. FIG. 5 (A) shows timings of DMA data transfers between the FIFO memories 8-1 and 8-2 on the one hand, and the compressed data storage means 11 on the other in FIG. 3. Specifically, the waveform (a) in FIG. 5 (A) stands for DMA data transfers between the FIFO memory 8-1 and the compressed data storage means 11, and the waveform (b) in FIG. 5(A) represents DMA data transfers between the FIFO memory 8-2 and the compressed data storage means 11. Each shaded portion in the charts indicates the time required to carry out a DMA data transfer.

In the setup above, a scheme is provided whereby the DMAC 9 is started when a predetermined amount of compressed data is accumulated in the FIFO memory 8-1. The predetermined amount of compressed data when accumulated in the FIFO memory 8-1 is transferred therefrom to the compressed data storage means 11. The predetermined amount of data may be half the capacity of the FIFO memory. Likewise, a predetermined amount of compressed data, when accumulated in the FIFO memory 8-2, separately causes the DMAC 9 to start and is transferred thereby to the compressed data storage means 11. The time $T_1$ in FIG. 5 (A) is the time required by the CPU 1 to start the DMAC 9 (i.e., overhead of the CPU 1).

For data expansion, the compressed data representing the divided images 5-1 and 5-2 in FIG. 4 are sent to the corresponding FIFO memories and compandors for a concurrent expanding process. The concurrent expansion of two image data segments produces one page of image data. Another scheme is devised whereby whenever a predetermined amount of memory space is vacated in either FIFO memory (i.e., half the FIFO memory capacity), the CPU 1 causes the DMAC 9 to start a DMA data transfer from the compressed data storage means 11 to the FIFO memory in question. For data transfer to the other FIFO memory, the CPU 1 separately activates the DMAC 9 to carry out the transfer.

One disadvantage of the above-described prior art apparatus proposed by this applicant is that it takes time to start the DMAC 9 by the CPU 1 every time the FIFO memories 8-1 and 8-2 are switched therebetween for DMA data transfer. The time thus consumed makes it difficult to transfer the data at high speeds.

To reduce the number of times the CPU 1 starts the DMAC 9 requires reducing the number of times the FIFO memories are switched. That in turn requires increasing the capacity of the FIFO memories. However, this measure if implemented would lead to another disadvantage: higher cost.

The above example involves two FIFO memories to deal with two divided images. If each page of image data is divided into more than two segments, the number of FIFO memories will be increased correspondingly. A larger number of FIFO memories entails an increased number of times the DMAC 9 is started. This means that by the time its turn has come to make a DMA data transfer, a particular FIFO memory may well have been filled with compressed data. With the available memory capacity of the FIFO memory thus exhausted, the compandor corresponding to that FIFO memory is stopped because it cannot output compressed data therefrom. That in turn makes it difficult for the apparatus to fully carry out concurrent image data processing at high speed.

SUMMARY OF THE INVENTION

It is therefore an object of the present invention to overcome the above and other deficiencies and disadvantages of the prior art and to provide an image data processing apparatus comprising an image memory divided into a plurality of segments; a plurality of compandors corresponding to the segments for individually processing the image data contained therein; a plurality of small-capacity temporary data storage means corresponding to the compandors;

shared compressed data storage means for storing compressed data sent as DMA data transfers from the small-capacity temporary data storage means; a DMA data transfer controller for controlling the DMA data transfers; a DMA data transfer request signal control circuit for outputting a DMA data transfer request signal on receiving one of a first and a second signal from the small-capacity temporary data storage means, the first signal indicating that at least a predetermined amount of compressed data is stored in the small-capacity temporary data storage means for data compression, the second signal denoting the end of data compression, the DMA data transfer request signal control circuit further outputting a DMA data transfer request signal upon receipt of a third signal from the small-capacity temporary data storage means, the third signal indicating that at least a predetermined amount of free storage space has become available in the small-capacity temporary data storage means for data expansion; and an I/O interface for supplying the DMA data transfer request control circuit with any one of the first, the second and the third signals.

In a preferred structure according to the invention, the DMA data transfer request signal control circuit comprises: a counter for counting DMA data transfer acknowledge signals from the DMA data transfer controller and for providing a counter output signal when a predetermined number of the DMA data transfer acknowledge signals have been counted; a data selector for selectively admitting for data compression the first signal indicating that at least a predetermined amount of compressed data is stored in the small-capacity temporary data storage means, the data selector further admitting selectively for data expansion the third signal indicating that at least a predetermined amount of free storage space has become available in the small-capacity temporary data storage means; a flip-flop circuit having a set and a reset terminal, the set terminal receiving the output of the data selector, the reset terminal admitting the counter output signal; and an OR circuit for performing an OR operation on the output of the flip-flop circuit and on the second signal denoting the end of data compression, the OR circuit further outputting the DMA data transfer request signal as a result of the OR operation.

In a further preferred structure according to the invention, the small-capacity temporary data storage means are FIFO memories, and the shared compressed data storage means is a RAM.

In operation, one page of image data is divided into a plurality of segments, each segment being processed by a separate compandor. The processed data is held in the small-capacity temporary storage means corresponding to each of the compandors matching the segments. The data held in the small-capacity temporary storage means are moved from there by DMA data transfer to the shared compressed data storage means. The DMA data transfers are carried out under control of the DMA data transfer controller that has been started by the CPU in advance. The DMA data transfer controller starts a DMA data transfer on receiving a DMA data transfer request signal.

The DMA data transfer request signal is generated by the DMA data transfer request signal control circuit corresponding to each of the small-capacity temporary data storage means. Since the DMA data transfer controller is already activated, a DMA data transfer is executed in a very short time after a DMA data transfer request signal is received.

During transfer of compressed data to the shared compressed data storage means, an appropriate circuit inside the DMA data transfer controller handles (on a hardware basis) changeovers from one small-capacity temporary data storage means to another. The time required to execute such changeovers is very short.

The setup above eliminates the need for the CPU to start the DMA data transfer controller every time a DMA data transfer switchover is carried out. With the overhead of the CPU thus reduced, the speed of overall processing is enhanced significantly.

These and other objects, features and advantages of the invention will become more apparent upon a reading of the following description and appended drawings.

BRIEF DESCRIPTION OF THE DRAWINGS

FIGS. 5 (A)–5 (C) show a set of timing charts depicting typical timings of DMA data transfers.

DESCRIPTION OF THE PREFERRED EMBODIMENT

Figure 1:
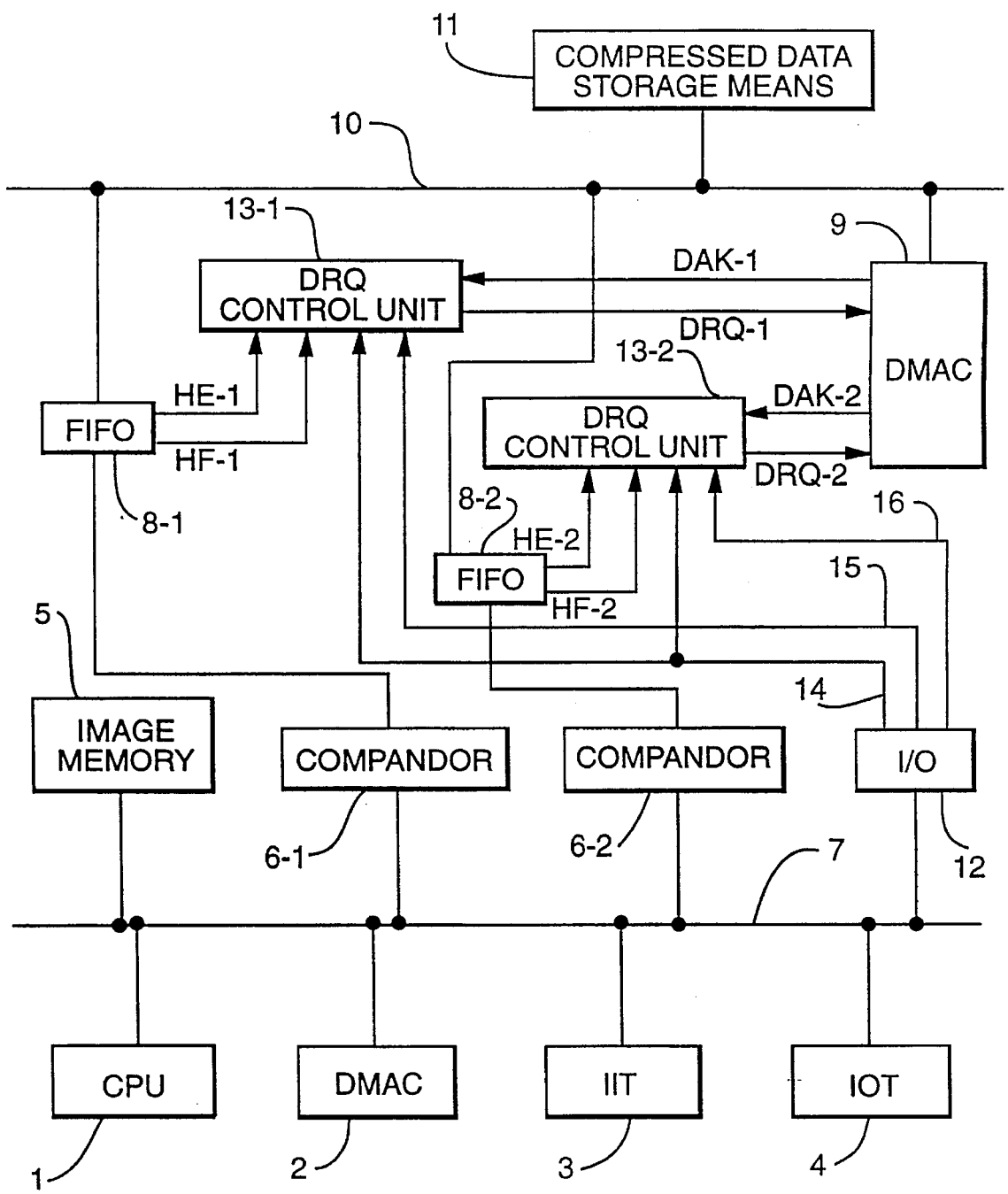
FIG. 1 is a block diagram of an image data processing apparatus embodying the invention.
Figure 3:
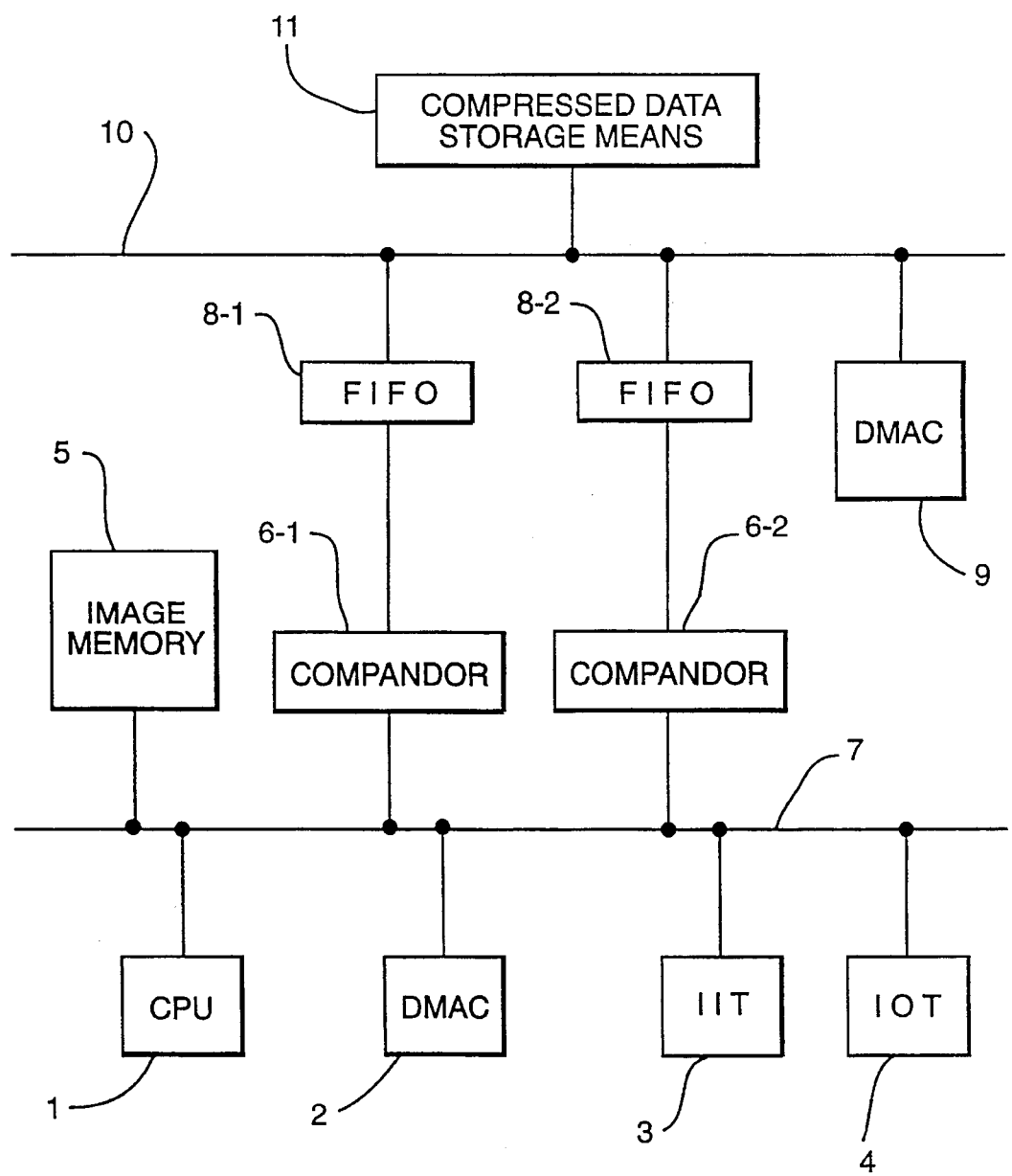
FIG. 3 is a block diagram of the typical prior art image data processing apparatus.

A preferred embodiment of the invention will now be described with reference to the accompanying drawings. FIG. 1 is a block diagram of an image data processing apparatus embodying the invention. Between FIGS. 1 and 3, like reference numerals designate like or corresponding parts. In FIG. 1, reference numeral 12 is an I/O interface; 13-1 and 13-2 are DRQ (DMA request) control circuits; and 14 through 16 are signal lines. Those parts in FIG. 1 which have substantially the same functions as their counterparts in FIG. 3 are designated by the same reference numerals except for the DMAC 9, as will be described later.

A first feature of the embodiment making it different from the typical prior art image data processing apparatus is that the embodiment has a separate DRQ control circuit corresponding to each of a plurality of FIFO memories for temporary storage of compressed data. A second feature making the embodiment distinct is that it includes the I/O interface 12 for temporarily latching various signals destined to the DRQ control circuits. Such signals fed to the DRQ control circuits include those designating the execution of either compression or expansion as well as the signal requesting a forced DMA data transfer.

For the embodiment to execute compression or expansion, the CPU 1 initially starts the DMAC 9. At this point, the CPU 1 sets as the amount of data transfer a quantity of data far greater (e.g., 8 kilobytes) than that of a single data block transfer (e.g., 1 kilobytes) from the FIFO memory 8-1 or 8-2. A data transfer between the FIFO memory 8-1 (or 8-2) and the compressed data storage means 11 is executed after a DMA data transfer request signal DRQ-1 (or DRQ-2) is received from the-DRQ control circuit 13-1 (or 13-2).

FIG. 5 (B) shows timings of DMA data transfers between the FIFO memories 8-1 and 8-2 on the one hand, and the compressed data storage means 11 on the other. Specifically, the waveform (a) in FIG. 5 (B) stands for DMA data transfers between the FIFO memory 8-1 and the compressed data storage means 11, and the waveform (b) in the same figure represents DMA data transfers between the FIFO memory 8-2 and the compressed data storage means 11. Each shaded portion in the charts indicates the time required to carry out a DMA data transfer.

A changeover from one FIFO memory, having finished its data transfer, to the other FIFO memory for a new data transfer is effected by an appropriate (hardware) circuit inside the DMAC 9. That is, the DMAC 9 changes channels for the changeover upon receipt of a DMA data transfer request signal DRQ-1 (or DRQ-2) from the DRQ control circuit 13-1 (or 13-2).

Thereafter, there is no need for the CPU 1 to start the DMAC 9 by executing a program. The time required for the changeovers (i.e., arbitration cycle) is denoted by $T_2$ in FIG. 5 (B). The time $T_2$ is far shorter than the time $T_1$ required of the CPU 1 to start the DMAC 9 in the prior art setup.

When the total amount of data transferred from any of the FIFO memories has reached that quantity of transferred data which was set initially in the DMAC 9, the DMAC 9 stops its operation. Where further data transfers are desired, the CPU 1 again starts the DMAC 9. Conventionally, the CPU 1 starts the DMA 9 for every kilobyte of data transferred. This embodiment, by contrast, has its CPU 1 start the DMA 9 illustratively for every 8 kilobytes of data transferred. As a result, the overhead of the CPU1 is reduced to one-eighth of that of the prior art setup.

[Constitution of the DRQ Control Circuit]

Figure 2:
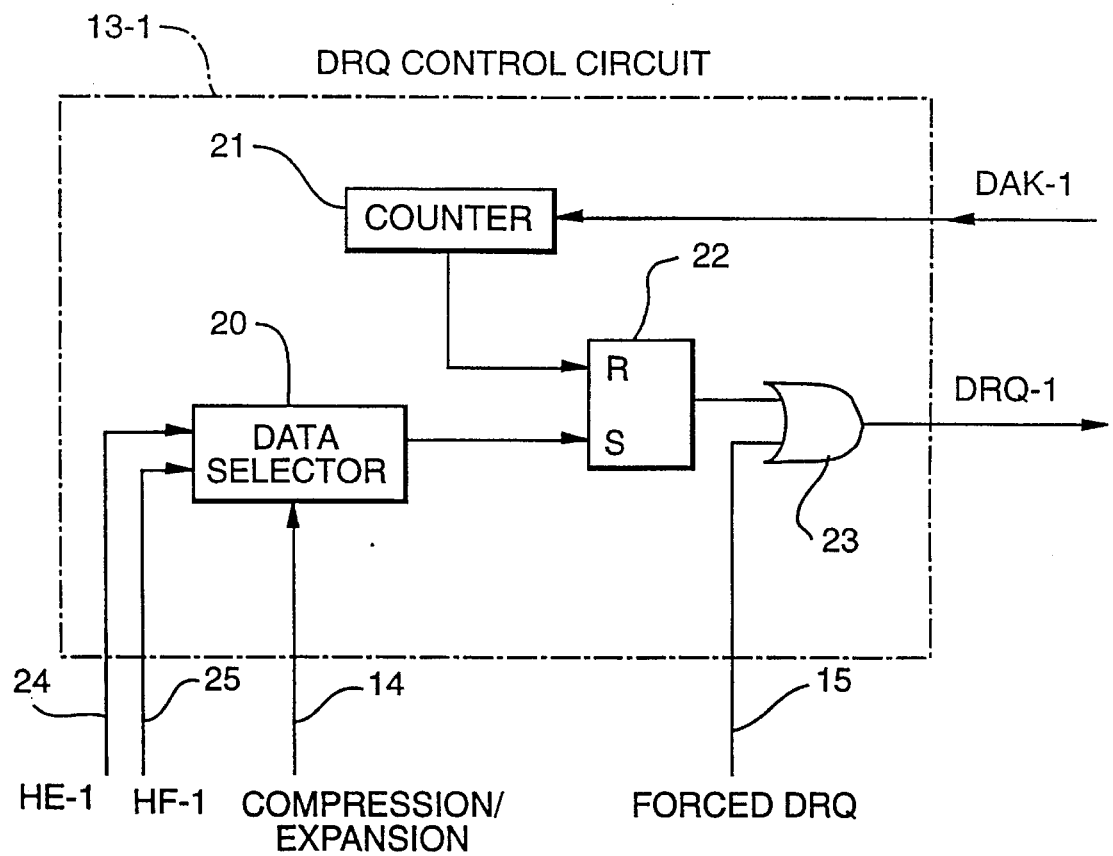
FIG. 2 is a block diagram outlining the constitution of a DRQ control circuit used by the embodiment of FIG. 1.
Figure 4:
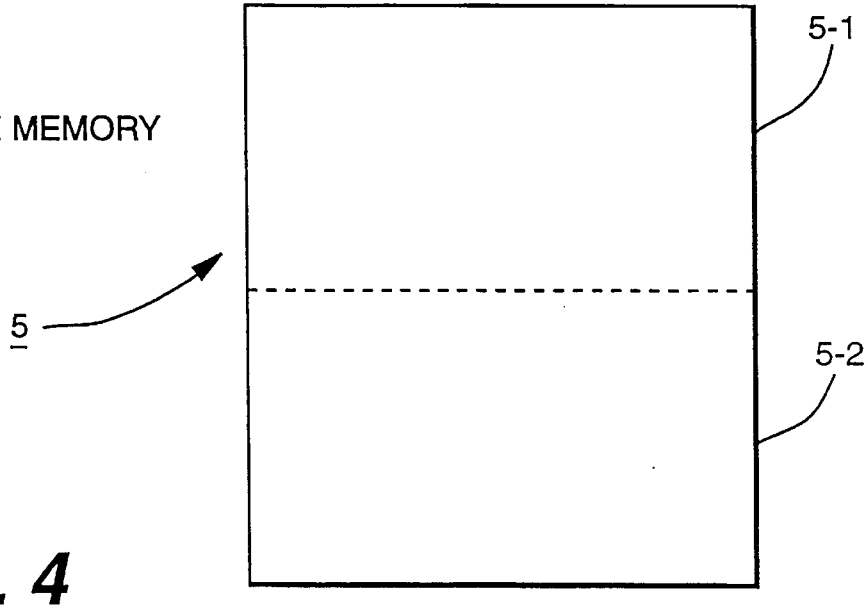
FIG. 4 is a view showing how one page of image data is divided into two segments.

FIG. 2 outlines the constitution of the DRQ control circuit 13-1 used by the embodiment. The DRQ control circuit 13-2 also has the same constitution. In FIG. 2, reference numeral 20 is a data selector; 21 is a counter; 22 is a flip-flop circuit; 23 is an OR circuit; and 14, 15, 24 and 25 are signal lines.

From the signal line 25 is admitted a signal HF (Half Full) indicating that half the capacity of the FIFO memory 8-1 is now full. This signal is used for compression. At the time of compression, more and more compressed data is sent from the compandor 6-1 to the FIFO memory 8-1 as the compression process progresses. When a predetermined amount of compressed data is accumulated in the FIFO memory 8-1, the latter requests a data transfer to the compressed data storage means 11. With this embodiment, the accumulated amount of compressed data to trigger a data transfer is set to be half the capacity of the FIFO memory 8-1. The signal HF is used to generate a data transfer request signal.

From the signal line 24 is admitted a signal HE (Half Empty) indicating that half the capacity of the FIFO memory 8-1 is now vacated. This signal is used for expansion. At the time of expansion, the compressed data sent from the compressed data storage means 11 to the FIFO memory 8-1 is vacated progressively therefrom as the compandor 6-1 proceeds in its expansion process. When a predetermined amount of free storage capacity is vacated in the FIFO memory 8-1, the latter requests another transfer of compressed data from the compressed data storage means 11. With this embodiment, the vacated storage capacity to trigger the data transfer is set to be half the capacity of the FIFO memory 8-1. The signal HE is used to generate a data transfer request signal.

From the signal line 14 is admitted a signal indicating that the process about to be performed is either compression or expansion. This signal is sent from the CPU 1 through the I/O interface 12. For compression, the data selector 20 selects the signal HF from the signal line 25; for expansion, the data selector 20 selects the signal HE from the signal line 24.

The signal selected by the data selector 20 is used as a set signal of the flip-flop circuit 22. The flip-flop 22, when set, outputs a signal that goes past the OR circuit 23 and is output as a DMA data transfer request signal DRQ-1.

[How the DRQ Control Circuit Works for Compression]

How the DRQ control circuit works for compression will now be described in detail. FIG. 5 (C) depicts timings applicable to the workings of the DRQ control circuit for compression. Like reference characters in FIG. 5 (C) designate like or corresponding signals or events in FIGS. 1 and 2. In FIG. 5 (C), a leading edge and a trailing edge of a signal indicate appearance and disappearance of that signal, respectively.

A leading edge in the waveform (a) of FIG. 5 (C) shows that the FIFO memory 8-1 has generated a Half Full signal (HF-1). Under the direction of the CPU 1, the I/O interface 12 sends to the data selector 20 a signal indicating that compression is about to start through the signal line 14. This causes the Half Full signal HF-1 entered through the signal line 25 to be selected. The signal HF-1 is input to the set terminal S of the flip-flop circuit 22. The output of the flip-flop circuit 22 is input to the OR circuit 23. The output of the OR circuit 23 is sent to the DMAC 9 as a DMA data transfer request signal DRQ-1 whose timing is illustrated by the waveform (b) in FIG. 5 (C).

Since the DMAC 9 is already activated by the CPU 1, the DMAC 9 immediately carries out a data transfer to the FIFO memory 8-1 upon receipt of the signal DRQ-1 unless the DMAC 9 is currently transferring data to the FIFO memory 8-2. Every time a unit amount of data (e.g., 1 byte) is transferred, the DMAC 9 supplies the counter 21 of the DRQ control circuit 13-1 with a DMA data transfer acknowledge signal DAK-1 whose timing is depicted by the waveform (c) in FIG. 5 (C).

After the start of data transfer, the amount of data in the FIFO memory 8-1 decreases and eventually drops below half the capacity of the latter. At that point, the signal HF-1 disappears, as evidenced by trailing edges in the waveform (a) of FIG. 5 (C). However, the DMA data transfer request signal DRQ-1 remains generated as long as the flip-flop circuit 22 provides its output. That is, the signal DRQ-1 does not necessarily disappear when the Half Full signal HF-1 has disappeared.

The counter 21 serves to keep constant the amount of data transferred by a single block transfer (i.e., burst transfer) from the FIFO memory 8-1. Where the constant amount of data transferred is set to be 1 kilobytes, the counter 21 is arranged to generate an output signal (Carry-Out signal) upon receipt of 1,024 signals DAK-1 whose timing is shown by the waveform (c) in FIG. 5 (C). The time required for 1,024 signals DAK1 to be admitted corresponds to the sum of the times indicated by the shaded portions in the waveform (a) of FIG. 5 (B).

The Carry-Out signal is input to the reset terminal R of the flip-flop circuit 22, whereby the output of the latter is brought Low. That in turn causes the DMA data transfer request signal DRQ-1 to disappear, as evidenced by trailing edges in the waveform (b) of FIG. 5 (C).

The timing charts made of the waveforms (d) through (f) in FIG. 5 (C) are associated with the workings of the FIFO memory 8-2 and DRQ control circuit 13-2. The waveform (d) in FIG. 5 (C) represents a Half Full signal HF-2 from the FIFO memory 8-2. In the above example, the signal HF-2 remains output since before the end of the data transfer from the FIFO memory 8-1. Likewise, the DMA data transfer request signal DRQ-2 remains generated since before the end of the data transfer from the FIFO memory 8-1. It should be noted that when the DMA data transfer request signal DRQ-2 was generated, the data transfer from the FIFO memory 8-1 was still in progress. This suppressed data transfers from the FIFO memory 8-2.

Upon completion of the last data transfer from the FIFO memory 8-1, the DMAC 9 changes transfer channels so that a data transfer from the FIFO memory 8-2 will become available. It takes appropriate hardware of the DMAC 9 the time $T_2$ (i.e., arbitration cycle) shown in FIG. 5 (C) to carry out the channel changeover. The time $T_2$ in FIG. 5 (C) corresponds to the time $T_2$ in FIG. 5 (B). Since the channel changeover is carried out on a hardware basis, the time $T_2$ is very short. Thereafter, the data transfer from the FIFO memory 8-2 is started, and a DMA data transfer acknowledge signal DAK-2 appears.

After the last part of the processing involving the divided images 5-1 and 5-2 has come to an end, the compressed data accumulated in the FIFO memory may not reach half the capacity thereof. If the predetermined amount of half the FIFO memory capacity is not reached, the Half Full signal HF will not be generated. In that case, the last part of the compressed data will not be transferred to the compressed data storage means 11, unless something is done.

To avert such an eventuality requires having the CPU 1 send a forced DMA data transfer request signal (forced DRQ) to one of the terminals of the OR circuit 23 via the I/O interface 12 and signal line 15 (or 16). The forced DMA data transfer request signal is then output from the OR circuit 23 to enable the last part of the compressed data to be transferred normally.

[How the DRQ Control Circuit Works for Expansion]

For expansion, a scheme is devised whereby an FIFO memory requests a compressed data transfer from the compressed data storage means 11 when, say, half of the FIFO memory capacity is vacated (half empty). The FIFO memory 8-1 sends in a Half Empty signal HE-1 over the signal line 24. The data selector 20 selects the signal HE-1 and sets the flip-flop circuit 22 thereby. The output of the flip-flop circuit 22 is sent through the OR circuit 23 to the DMAC 9 as a DMA data transfer request signal DRQ-1.

After a data transfer from the compressed data storage means 11 has started, the DMAC 9 outputs a DMA data transfer acknowledge signal DAK-1. When the amount of data set on the counter 21 has been transferred to the FIFO memory 8-1, the flip-flop circuit 22 is reset, and the DMA data transfer request signal DRQ-1 disappears.

While the DMA data transfer request signal DRQ-2 is being output by the FIFO memory 8-2, the DMAC 9 changes transfer destinations on a hardware basis. The DMAC 9 then starts transferring data from the compressed data storage means 11 to the FIFO memory 8-2.

The DMA data transfer request signal is not needed for data expansion. This is because all compressed data corresponding to the divided images 5-1 and 5-2 will eventually come into the FIFO memories if a data transfer is carried out every time an FIFO memory issues the Half Empty signal HE.

As described, the embodiment of the invention has the CPU activate in advance the DMA data transfer controller for controlling DMA data transfers between each FIFO memory and the compressed data storage means. Data transfers are carried out when a DMA data transfer request signal is received from the DMA data transfer request signal control circuit. This arrangement eliminates the need for the CPU to start the DMA data transfer controller every time a data transfer is effected. Without the time required of the CPU to start the DMA data transfer controller, the speed of the processing is enhanced significantly.

As many apparently different embodiments of this invention may be made without departing from the spirit and scope thereof, it is to be understood that the invention is not limited to the specific embodiments thereof except as defined in the appended claims.

What is claimed is:

1. An image data processing apparatus comprising:

an image memory divided into a plurality of segments;

a plurality of compandors corresponding to said segments for individually processing the image data contained therein;

a plurality of small-capacity temporary data storage means corresponding to said compandors;

shared compressed data storage means for storing compressed data sent as DMA data transfers from said small-capacity temporary data storage means;

a DMA data transfer controller for controlling the DMA data transfers, said DMA data transfer controller being initiated prior to one of a compression process and an expansion process and being kept in operation during said one of said compression process and said expansion process;

a DMA data transfer request signal control circuit provided for each of said small-capacity temporary data storage means for outputting the DMA data transfer request signal during said data compression process upon receipt of one of a first signal and a second signal, said first signal indicating that at least a predetermined amount of compressed data is stored in said each of said small-capacity temporary data storage means, said second signal denoting the end of the data compression process, said DMA data transfer request signal control circuit further outputting the DMA data transfer request signal during said expansion process upon receipt of a third signal, said third signal indicating that at least a predetermined amount of free storage space has become available in said small-capacity temporary data storage means for data expansion; and means for supplying said DMA data transfer request control circuit with any one of said first signal, said second signal, and said third signal.

2. An image data processing apparatus according to claim 1, wherein said small-capacity temporary data storage means are first-in first-out memories.

3. An image data processing apparatus according to claim 1, wherein said shared compressed data storage means is a random access memory.

4. An image data processing apparatus according to claim 1, wherein said DMA data transfer request signal control circuit comprises:

a counter for counting DMA data transfer acknowledge signals from said DMA data transfer controller and for providing a counter output signal when a predetermined number of said DMA data transfer acknowledge signals have been counted;

a data selector for selectively admitting for data compression said first signal indicating that at least a predetermined amount of compressed data is stored in said small-capacity temporary data storage means, said data selector further admitting selectively for data expansion said third signal indicating that at least a predetermined amount of free storage space has become available in said small-capacity temporary data storage means;

a flip-flop circuit having a set and a reset terminal, said set terminal receiving the output of said data selector, said reset terminal admitting said counter output signal; and an OR circuit for performing an OR operation on the output of said flip-flop circuit and on said second signal denoting the end of data compression, said OR circuit further outputting said DMA data transfer request signal as a result of said OR operation.

5. An image data processing apparatus comprising:

an image memory divided into a plurality of segments;

a plurality of compandors corresponding to said segments for individually processing the image data contained therein;

a DMA data transfer controller for controlling DMA data transfers, said DMA data transfer controller being initiated prior to one of a compression process and an expansion process and being kept in operation during said one of said compression process and said expansion process; and said DMA data transfer controller causing said channels assigned to said plurality of temporary data storage means to operate in turn during said one of said compression process and said expansion process.

* * * * *